United States Patent [19]

Ficalora et al.

[11] Patent Number: 5,327,212
[45] Date of Patent: Jul. 5, 1994

[54] ACCELERATION SENSING RING LASER GYROSCOPE

[75] Inventors: Joseph P. Ficalora, Oak Ridge; Mark S. Grasso, Whippany, both of N.J.

[73] Assignee: AlliedSignal Inc., Morris Township, Morris County, N.J.

[21] Appl. No.: 690,135

[22] Filed: Apr. 23, 1991

[51] Int. Cl.⁵ .............................................. G01B 9/02
[52] U.S. Cl. ................................................... 356/350
[58] Field of Search ........................ 356/350, 349, 351; 73/517 R; 372/94

[56] References Cited

U.S. PATENT DOCUMENTS

| 4,445,376 | 5/1984 | Merhav | 73/517 R |
| 4,637,255 | 1/1987 | Martin | 356/349 |
| 4,815,321 | 3/1989 | Malvern | 356/349 |

Primary Examiner—Mark Hellner
Attorney, Agent, or Firm—Donald B. Paschburg; Howard G. Massung

[57] ABSTRACT

A ring laser gyroscope functions both as a standard gyroscope and as an accelerometer. As the ring laser gyroscope experiences acceleration along its input axis, the frame bends and position sensing photodiodes are utilized to detect the optic axis motion and laser beam intensity. By measuring optic axis shifts along the gyro input axis during acceleration, a signal proportional to acceleration is obtained.

9 Claims, 4 Drawing Sheets

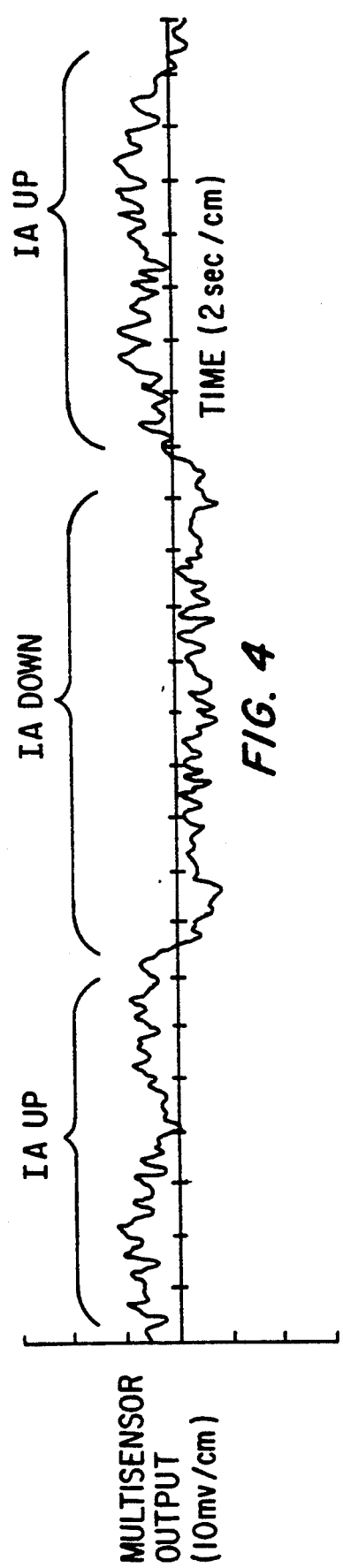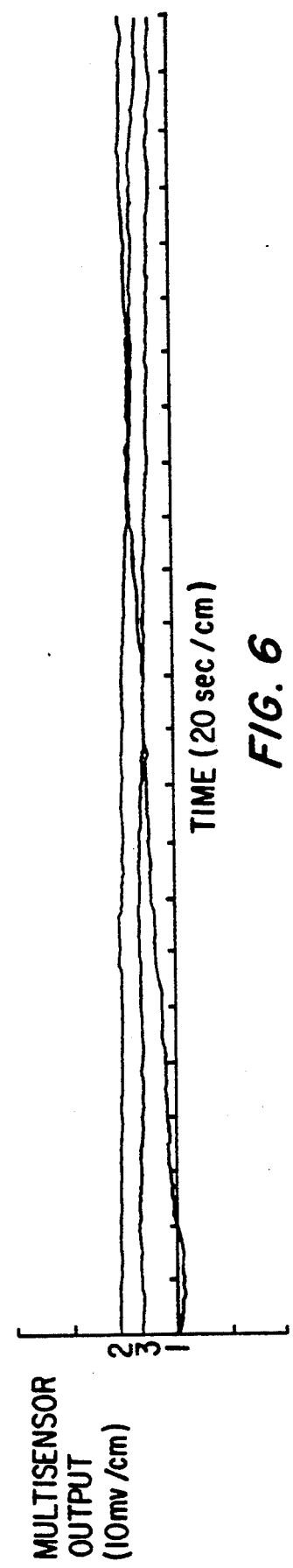

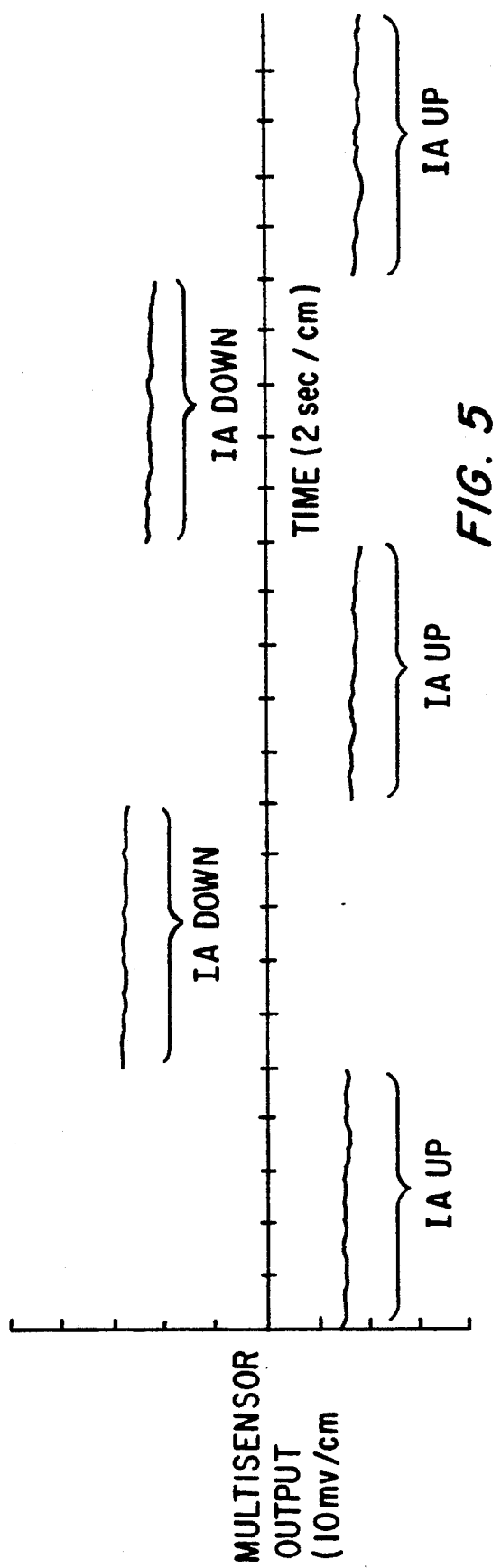

ND_LASER
ACCELERATION SENSING RING LASER GYROSCOPE

BACKGROUND OF THE INVENTION

1. Field of the Invention

The present invention relates to the field of ring laser gyroscopes and more particularly to a ring laser gyroscope that functions as a standard gyroscope as well as an accelerometer.

2. Description of the Prior Art

The prior art has disclosed several attempts of controlling the bending of the frame of a ring laser gyroscope. Bending of the frame is disclosed in U.S. Pat. No. 4,386,853 to Ljung. This patent includes a bending actuator for a ring laser gyroscope where bias shifts arising from acceleration or temperature gradient changes can be eliminated by bending the ring laser gyroscope block in an amount substantially proportional to the change. A voltage is applied to one or more piezoelectric crystals bonded to the top and bottom faces of the ring laser gyroscope block. The block can thus be bent to change the pyramid angle by an amount sufficient to offset changes in the pyramid angle caused by bending due to temperature gradient and acceleration changes and, hence, to eliminate this as a source of bias.

SUMMARY OF THE INVENTION

The present invention discloses a ring laser gyroscope that functions both as a standard gyroscope and as an accelerometer. The accelerometer capability results from measurement of small optic axis shifts along the ring laser gyroscope input axis during acceleration. The location of the optic axis formed by the path of the laser is very sensitive to apex tilts due to the resonant nature of the ring laser gyroscope cavity. When the ring laser gyroscope experiences acceleration, the frame bends and the apexes tilt. By measuring the optic axis motion and laser beam intensity with a position sensing photodetector a signal proportional to acceleration is obtained.

BRIEF DESCRIPTION OF THE DRAWINGS

FIG. 4 illustrates test data of the ring laser gyroscope of the present invention under the effect of an acceleration with only one position sensing photodetector.

FIG. 5 illustrates test data of the ring laser gyroscope of the present invention under the effect of an acceleration.

FIG. 6 illustrates test data over a 25 minute draft test.

DETAILED DESCRIPTION OF THE INVENTION

A ring laser gyroscope is a rotation sensor created by a helium neon laser and having a resonant cavity which is defined by a glass ceramic frame and a number of high reflectivity mirrors. The optic axis of the helium neon laser within the resonant cavity depends on the locations and angles of the high reflectivity mirrors. If any of the mirror angles are changed, the location of the optic axis of the laser changes. During acceleration, parallel to the gyro's input axis (IA), the ring laser gyroscope's frame distorts. The present invention takes advantage of the frame's distortion.

Figure 1:
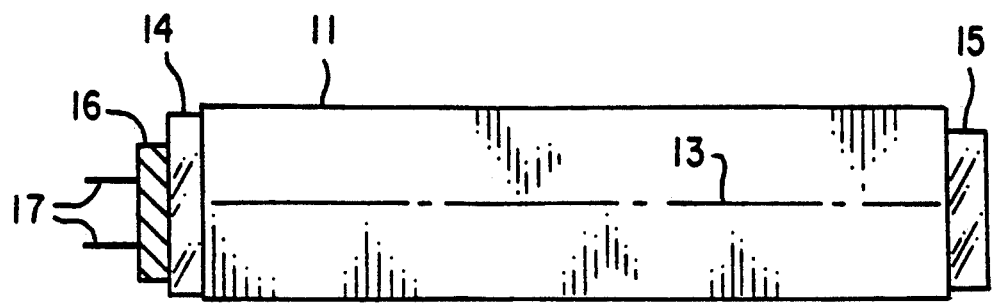
FIG. 1 illustrates one side of a ring laser gyroscope frame.

FIG. 1 illustrates one side of a multisided ring laser gyroscope frame 11. A three-sided ring laser gyroscope frame would have a total of three sides and three mirrors. A four-sided ring laser gyroscope would have a total of four sides and four mirrors. Frame 11 has an optic axis 13 through the frame's center. Also shown in FIG. 1 are two mirrors 14, 15, one at each end of the side of frame 11. A position sensing photodetector 16, which is located behind mirror 14, measures motion of optic axis 13. Electrodes 17 are attached to position sensing photodetector 16 for providing signals proportional to the location of optic axis 13.

Figure 2:
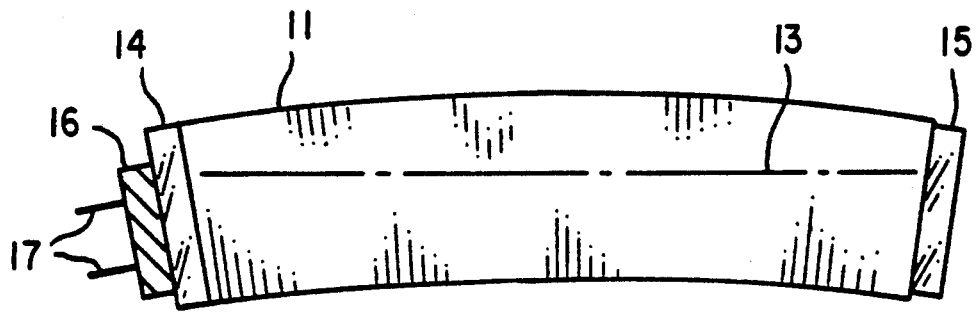
FIG. 2 illustrates one side of a ring laser gyroscope frame under the effect of acceleration.

FIG. 2 illustrates one side of ring laser gyroscope frame 11 and mirrors 14, 15 of the ring laser gyroscope under the affects of acceleration. When the ring laser gyroscope experiences acceleration along its input axis, frame 11 bends like a simple beam and mirrors 14, 15 tilt. In a four-sided ring laser gyroscope, all four mirrors tilt, and the optic axis 13 of the laser translates. Position sensing photodetector 16 is utilized to detect this motion and electrodes 17 are attached to position sensing photodetector 16 for providing signals proportional to acceleration.

One of the advantages of using the ring laser gyroscope as an accelerometer is the resonant nature of the optic axis. Small tilts of the mirrors, three in a three-sided gyro and four in a four-sided gyro, cause easily measurable changes in the location and intensity of the optical path.

In a ring laser gyroscope, two photodetectors are required to average the cw and ccw intensities which fluctuate slightly depending on the magnitude and direction of the input rate. Each photodetector provides two signals proportional to the location of the beam on the photodetector. By taking the difference of these two signals and by dividing this difference by the sum of the two signals, a signal proportional to beam location can be obtained. The sum represents the power of the ring laser gyroscope and therefore can be used to close the path length control loop as is known in the art.

The preferred embodiment of the present invention utilizes photodetectors comprising two lateral effect photodiodes for measuring both the intensity of the laser beam and the motion of the optic axis. In an alternate embodiment, a split photodiode may also be used. A lateral effect photodiode consists of two electrodes located on the edges of the photodiode. When a light spot is imaged onto the surface of the lateral effect photodiode, the photocurrent is divided between the two electrodes of the photodiode. This division is in proportion to the distance of the light spot from those electrodes.

Figure 3:
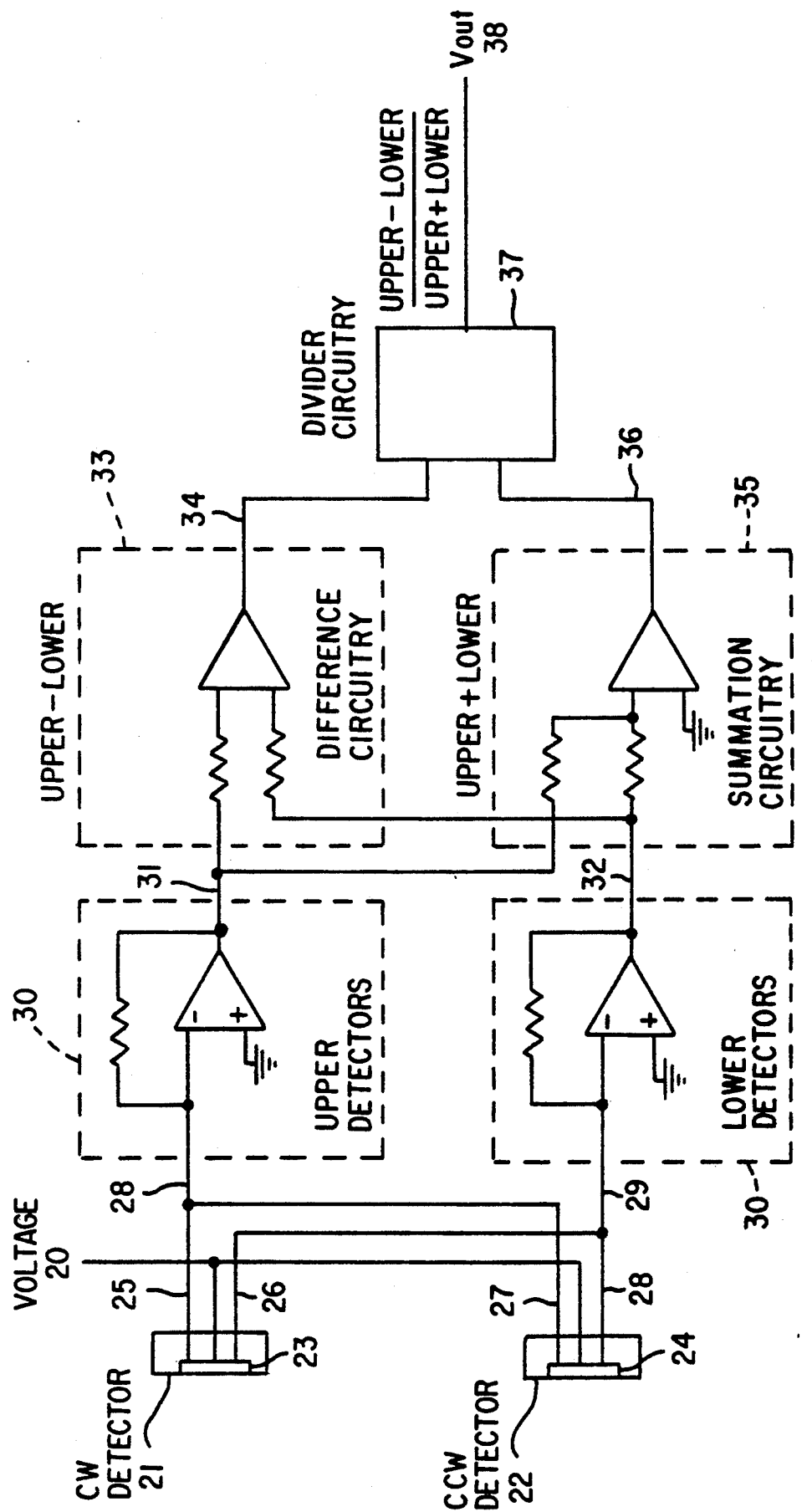
FIG. 3 illustrates a schematic of photodetector circuitry utilized in the present invention.

FIG. 3 illustrates a schematic of the photodetector circuitry. From FIG. 3, two photodetectors, CW detector 21 and CCW detector 22 receive power from Voltage 20. Voltage is usually 15 volts. In a preferred embodiment, cw detector 21 and ccw detector 22 comprise lateral effect photodiodes 23, 24 respectively. Lateral effect photodiode 23 consist of upper electrode 25 and lower electrode 26. Lateral effect photodiode 24 consist of upper electrode 27 and lower electrode 28. As shown in the schematic of FIG. 3, upper electrode 25 and upper electrode 27 are connected together to form upper signal 28. Lower electrode 26 is likewise connected to lower electrode 28 to form lower signal 29.

Both, upper signal 28 and lower signal 29 are amplified by amplifiers 30 which provide amplified upper signal 31 and amplified lower signal 32. Difference circuitry 33 then subtracts amplified lower signal 32 from amplified upper signal 31 and provides difference signal 34. Summation circuitry 35 adds amplified upper signal 31 with amplified lower signal 32 and provides summation signal 36. Divider circuitry 37 then divides difference signal 34 by summation signal 36 and provides Vout 38.

An alternate embodiment of the present invention includes a closed loop control of the beam motion. This can be accomplished by either bending the ring laser gyroscope frame, as discussed in the Description of the Prior Art, to correct for acceleration induced distortion or by tilting the closed loop cavity length controls to correct for beam motion. This alternate embodiment is especially useful for lightweight frames that have corners which bend a greater amount under the effects of acceleration. These lightweight frames have increased sensitivity to acceleration but need the closed loop control in order to maintain the dynamic range. The tilting of closed loop controls is easily accomplished and is the preferred approach for the closed loop embodiment. This can be implemented by utilizing split piezoelectric drivers. This arrangement will avoid any problems with accelerometer nonlinearities.

Initial experimental data of the present invention was obtained by using only one split photodiode. An additional circuit was utilized to amplify and manipulate the output of the split photodiode so as to provide a signal proportional to displacement. FIG. 4 illustrates a plot of the data taken while the gyroscope's IA was varying up and down. This is a two G change and was easily discernable. A dynamic range of 180 was achieved by simulating a large G load by bending the frame.

A second experiment utilized a gyroscope comprising two split photodiodes instead of the one split photodiode. Initial test results indicated that there was a dither noise signal during the transition through locking even with the use of two split photodiodes. In a normal application, the bandwidth of the accelerometer would be below the dither frequency, therefore, the dither noise could be removed with a low pass filter. A 10 Hertz low pass filter was then included and FIG. 5 illustrates a plot of the data taken while the gyroscope's IA was varying up and down. Again, the two G change is clear, but the noise is reduced due to the use of the two split photodiodes and the low pass filter. From FIG. 5, the scale factor can roughly be determined to be 20mV/G. The current noise is about 5mV peak-to-peak which corresponds to 0.25 G's peak-to-peak. This is electronic noise which can be reduced. The dynamic range can be calculated since a normal ring laser gyroscope can operate to several hundred G's. This corresponds to a dynamic range of approximately 1000. FIG. 6 illustrates the results of a 25 minute drift test which provided a bias stability of 0.6 G's peak-to-peak. These performance numbers are for a modified gyroscope prototype and only represent the proof of concept.

It is not intended that this invention be limited to the hardware arrangements, or operational procedures shown disclosed. This invention includes all of the alterations and variations thereto as encompassed within the scope of the claims as follows.

We claim:

1. A ring laser gyroscope and accelerometer comprising:

a ring laser frame containing reflective surfaces which define a closed loop optical path in which oppositely directed beams of light may travel; and, means for analyzing intensity and motion of said oppositely directed beams of light and for providing an output signal proportional to acceleration, wherein said means for analyzing comprises:

a plurality of photodetectors each having an upper electrode and a lower electrode an located behind one of said reflective surfaces to measure changes in intensity and motion of said oppositely directed beams of light; and, circuitry means for analyzing signals from said plurality of photodetectors.

2. A ring laser gyroscope and accelerometer comprising:

a ring laser frame containing reflective surfaces which define a closed loop optical path in which oppositely directed beams of light may travel; and, means for analyzing intensity and motion of said oppositely directed beams of light and for providing an output signal proportional to acceleration, wherein said means for analyzing comprises:

two photodetectors each having an upper electrode and a lower electrode and located behind one of said reflective surfaces to measure changes in intensity and motion of said oppositely directed beams of light; and, circuitry means for analyzing signals from said two photodetectors.

3. A ring laser gyroscope and accelerometer comprising:

a ring laser frame containing reflective surfaces which define a closed loop optical path in which oppositely directed beams of light may travel; and, means for analyzing intensity and motion of said oppositely directed beams of light and for providing an output signal proportional to acceleration, wherein said reflective surfaces comprise four high reflectivity mirrors; and, wherein said means for analyzing comprises:

two photodetectors each having an upper electrode and a lower electrode and located behind one of said four high reflectivity mirrors to measure changes in intensity and motion of said oppositely directed beams of light; and, circuitry means for analyzing signals from said two photodetectors.

4. A ring laser gyroscope and accelerometer comprising:

a ring laser frame containing reflective surfaces which define a closed loop optical path in which oppositely directed beams of light travel;

at least one cathode and at least one anode connected to said closed loop optical path for energizing said ring laser gyroscope multisensor when a voltage is connected between said cathode and said anode;

two photodetectors each having an upper electrode and a lower electrode and located behind one of said reflective surfaces to measure changes in intensity and motion of said oppositely directed beams of light; and, upper combination means for combining signals from said upper electrodes and for providing a combined upper electrode signal;

lower combination means for combining signals rom said lower electrodes and for providing a combined lower electrode signal;

means for calculating said combined upper electrode signal minus said combined lower electrode signal divided by said combined upper electrode signal plus said combined lower electrode signal.

5. A ring laser gyroscope and accelerometer as claimed in claim 1 wherein said circuitry means comprises;
- upper combination means for combining signals from said upper electrodes and for providing a combined upper electrode signal;
- lower combination means for combining signals from said lower electrodes and for providing a combined lower electrode signal;
- means for calculating said combined upper electrode signal minus said combined lower electrode signal divided by said combined upper electrode signal plus said combined lower electrode signal.

6. A ring laser gyroscope and accelerometer as claimed in claim 1 wherein said plurality of photodetectors comprise a plurality of lateral photodiodes.

7. A ring laser gyroscope and accelerometer as claimed in claim 3 wherein said circuitry means comprises;
- upper combination means for combining signals from said upper electrodes and for providing a combined upper electrode signal;
- lower combination means for combining signals from said lower electrodes and for providing a combined lower electrode signal;
- means for calculating said combined upper electrode signal minus said combined lower electrode signal divided by said combined upper electrode signal plus said combined lower electrode signal.

8. A ring laser gyroscope and accelerometer as claimed in claim 3 wherein said two photodetectors each comprise lateral photodiode.

9. A ring laser gyroscope and accelerometer as claimed in claim 3 wherein said circuitry means comprises;
- upper combination means for combining signals from said upper electrodes and for providing a combined upper electrode signal;
- lower combination means for combining signals from said lower electrodes and for providing a combined lower electrode signal;
- amplifier means for amplifying said combined upper electrode signal and said combined lower electrode signal and for providing an amplified upper electrode signal and an amplified lower electrode signal;
- difference circuitry means for subtracting said amplified lower electrode signal from said amplified upper electrode signal and for providing a difference signal;
- summation circuitry means for adding said amplified upper electrode signal and said amplified lower electrode signal and for providing a summation signal; and,
- divider circuitry means for dividing said difference signal by said summation signal and for providing an output signal which is proportional to acceleration.

* * * * *